United States Patent

[11] 3,562,552

| [72] | Inventors | Louis J. Baudino, Jr.<br>Littleton;<br>James A. Bright, Denver, Colo. |
|---|---|---|
| [21] | Appl. No. | 705,963 |
| [22] | Filed | Feb. 16, 1968 |
| [45] | Patented | Feb. 9, 1971 |
| [73] | Assignee | Honeywell Inc.<br>Minneapolis, Minn.<br>a corporation of Delaware |

[54] RMS TO LOG CONVERTER CIRCUIT
13 Claims, 9 Drawing Figs.

[52] U.S. Cl. .................................................... 307/229,
328/144, 328/145
[51] Int. Cl. ....................................................... G06g 7/24
[50] Field of Search........................................... 324/132;
328/145; 307/229; 235/197, 193.5

[56] References Cited
UNITED STATES PATENTS

| 2,575,073 | 11/1951 | Seiz et al...................... | 328/145 |
| 2,810,107 | 10/1957 | Sauber ......................... | 324/132 |
| 2,887,576 | 5/1959 | Harmuth ....................... | 328/144 |
| 3,187,323 | 6/1965 | Flood et al.................... | 324/115 |
| 3,374,361 | 3/1968 | Callis........................... | 328/145 |

*Primary Examiner*—Donald D. Forrer
*Assistant Examiner*—Harold A. Dixon
*Attorneys*—Arthur H. Swanson and Lockwood D. Burton ABSTRACT: There is provided a circuit which operates upon a complex input waveform to produce an output signal which is a DC log signal proportional to the RMS value of an AC input signal.

INVENTORS.
LOUIS J. BAUDINO
JAMES A. BRIGHT
BY
*G. Donald Weber Jr.*
ATTORNEY.

INVENTORS.
LOUIS J. BAUDINO
JAMES A. BRIGHT

BY G. Donald Weber Jr.

ATTORNEY.

INVENTORS.
LOUIS J. BAUDINO
JAMES A. BRIGHT
BY G. Donald Weber Jr.
ATTORNEY.

RMS TO LOG CONVERTER CIRCUIT

There are many types of signal conditioning instruments available on the market today. These signal conditioning instruments are used to operate upon available input signals to provide a different type of output signal. Such instruments include voltage controlled oscillators, waveshapers and the like.

It is often desirable for those working in the instrumentation field to receive a complex waveform and produce a DC or DC log output which is proportional to the true RMS value of the input signal. The instant invention provides a desirable and useful circuit for performing such a function. The subject circuit is capable of operating on complex AC waveforms which exhibit crest factors up to 10DB. The log output signal produced by the circuit supplies to 1.0 volt DC signal for every 10DB at the input. This is partially achieved due to switchable gain amplifier sections.

That is, an automatic gain change is accomplished by connecting a plurality of variable gain AC feedback amplifiers in series. Each amplifier has two or more gain settings controlled by a level sensor and individual comparators. The amplifiers have gains of 0DB, 10DB or 20DB depending upon the input level. The output of the amplifier section is operated upon to produce a logarithmically varying signal which is proportional to the RMS input signal. In addition, the circuit produces an amplified AC signal, a DC voltage proportional to the mean squared value of the input signal which produces signals are available simultaneously with the log output.

One object of this invention is to provide a signal conditioning instrument.

Another object of this invention is to provide a signal conditioning instrument which converts a complex AC waveform into a DC OUTPUT SIGNAL.

Another object of this invention is to provide a signal conditioning instrument wherein the RMS value of an input signal is converted to a DC log signal which is proportional to the RMS value of the varying input signal.

Another object of this invention is to convert a wide dynamic range input signal to a dynamic range suitable operation with good resultion.

These and other objects and advantages of this invention will become more readily understood when the following description is read in conjunction with the attached drawings, in which.

Figure 1:
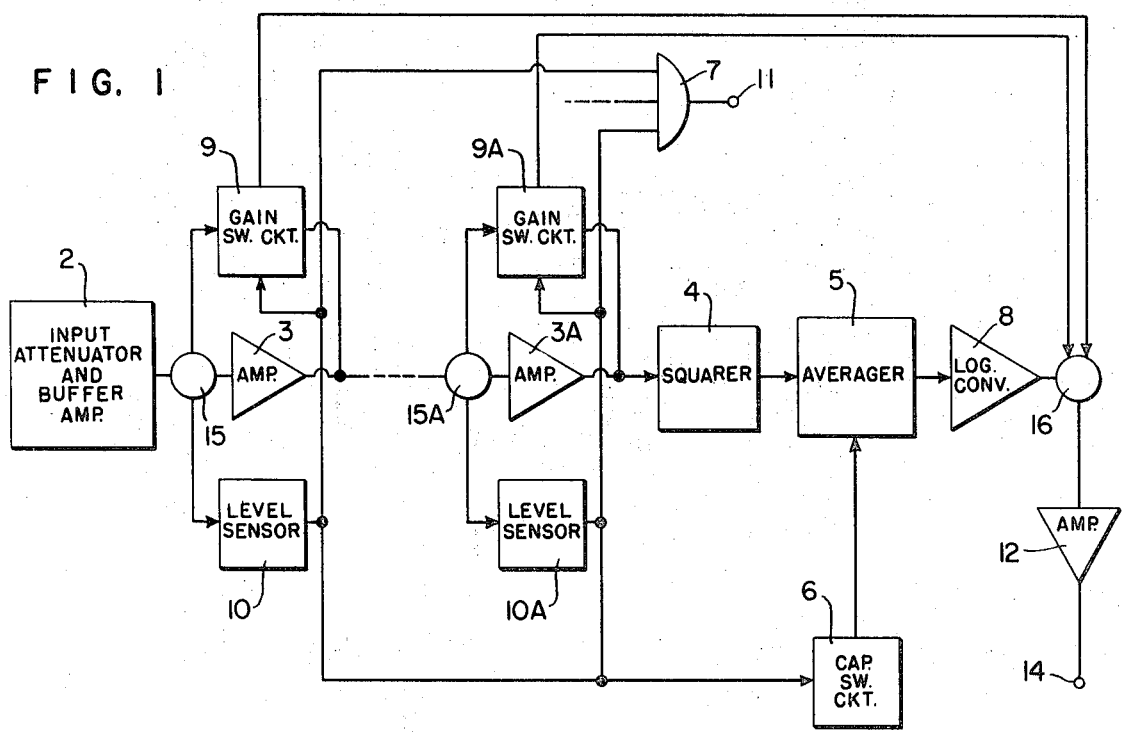
FIG. 1 is a block diagram of the instrument.

Referring now to FIG. 1, there is shown a block diagram of the subject circuit. The input attenuator and buffer amplifier 2 receives the complex input waveform which is to be operated upon. The signal from input attenuator and buffer amplifier 2 is connected to amplifier 3 by coupling circuit 15. This signal is also applied to level sensor/comparator 10 and gain switch circuit 9. The output of the level sensor/comparator 10 is applied to the gain switch circuit 9 to control the operation thereof. In addition, the output of level sensor/comparator 10 is applied to one terminal of the gated logic network 7. The output of amplifier 3 is connected to the output of gain switch circuit 9. Thus, gain switch circuit 9 is connected in parallel with amplifier 3 to provide a variable feedback network wherein the gain of amplifier 3 is varied. The output of gain switch circuit 9 is connected to summing junction 16.

The output of amplifier 3 is connected, via coupling circuit 15A which is equivalent to coupling circuit 15, to the input of amplifier 3A. Amplifier 3A is a counterpart of amplifier 3 and may be eliminated if amplifier 3 has sufficient gain. In the event that a large gain is required for the system, N amplifiers are utilized to provide such gain. Again, the signal from amplifier 3 is connected via coupling circuit 15A to the inputs of level sensor/comparator 10A and gain switch circuit 9A. The latter circuits are counterparts to the similarly designated circuits in the first amplification stage. Again the output of level sensor/comparator 10A is connected to the input of gain switch 9A and to another input of logic network 7. The outputs of amplifier 3A and gain switch circuit 9A are connected together to provide the feedback gain circuit, Also, the output of gain switch circuit 9A is connected to summing junction 16.

The output of amplifier 3A is connected to squarer 4. The squarer 4 operates on the AC signal supplied thereto to produce the mean squared value of the AC signal. The output of squarer 4 is supplied to averager 5 which includes a low pass filter to obtain the DC, mean squared voltage.

Averager 5 has an input from capacitor switch circuit 6 which permits averager 5 to operate in different ranges. Capacitor switch circuit 6 receives signals from level sensors/comparator 10 and the counterpart level sensors/comparator 10A, if any.

The output of the averager 5 is connected to the log converter 8. Log converter 8 operates upon the DC level supplied by the averager 2 to produce a log output signal which is the square root of the DC mean square signal supplied thereto. The output of log converter 8 is connected to summing junction 16.

Amplifier 12 is an operational summing amplifier and has the input thereof connected to summing junction 16. Amplifier 12 incorporates the gain code logic signals from the AC amplifier sections into the analogue output of log converter P. This signal incorporation establishes the scale factor of the log output. That is, the signal supplied to summing junction 16 from log converter 8 corresponds to a 10DB input signal range due to the automatic gain switching. However, the signal from the log converter is unrelated to the actual amplitude of the AC input signal. In order to make the output log converter 8 proportional to the AC input signal level, a DC voltage level related to the AC amplifier gain is added thereto. In fact, the DC voltage level is provided by the gain code signals and is converted to current which is then summed with the current provided at the output of log converter 8.

Figure 2:
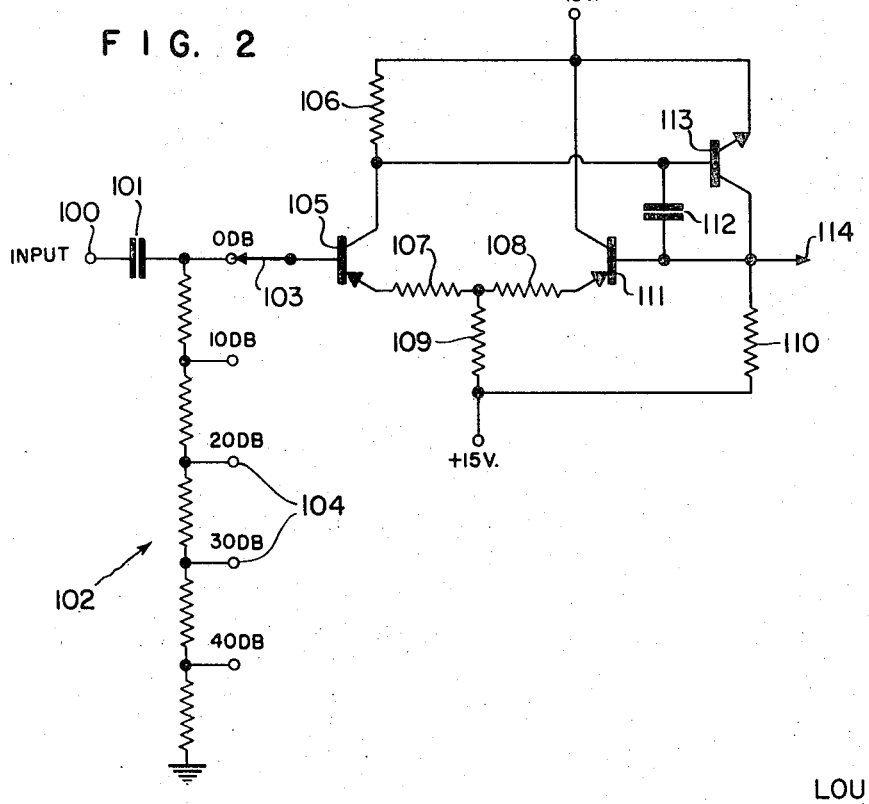
FIG. 2 is a schematic diagram of the input attenuator and amplifier.

Referring to FIG. 2, there is shown a schematic diagram of the input attenuator and amplifier circuit. The AC input signal is applied to input terminal 100. Terminal 100 is connected via coupling capacitor 101 to resistive attenuator 102. Specifically, the attenuator may comprise a plurality of resistors. In the embodiment shown, five resistors are connected between the capacitor 101 and ground. Each of the junctions between the resistors is connected to a separate one of terminals 104 which terminals may form a portion of a rotary switch or the like. The armature 103 of the switch is selectively connected to one of the terminals 104 to obtain an input signal. As shown, each of the terminals 104 represents decade attenuation ratios of the input signal in terms of decibels.

Armature 103 is connected to the base of PNP transistor 105. The collector electrode of transistor 105 is connected via resistor 106 to a −15 volt source. The emitter electrode of transistor 105 is connected via series resistors 107 and 109 to a +15 volt source. The common junction between resistors 107 and 109 is connected via resistor 108 to the emitter of PNP transistor 111. The collector of transistor 111 is connected to the −15 volt source. The base of transistor 111 is connected to the collector electrode of transistor 113 and to output terminal 114. The base of NPN transistor 113 is connected to the collector of transistor 105. The emitter of transistor 113 is connected to the −15 volt source. Resistor 110 is connected between the +15 volt source and the collector of transistor 113. Phase compensation capacitor 112 is connected between the bases of transistor 111 and 113. Output terminal 114 is connected to the input of the AC amplifier section shown and described hereinafter.

Typically, the input attenuator and buffer amplifier shown in FIG. 2 are used to select the ranges of input voltage signal and to provide impedance matching, respectively. The amplifier has a high input impedance to produce little loading on the attenuator and a low output impedance in order to drive the AC amplifier. As is seen, the buffer amplifier is basically a two stage amplifier with 100 percent feedback from the output of the second stage to the inverting input of the differential input stage. Thus, there is provided a noninverting, unity gain amplifier.

The input attenuator 102 is not essential to the operation of the circuit. That is, the buffer amplifier has a full scale capability of operating with input signals of ± 1.0 volt RMS. If the input signal levels are maintained below 1.0 volt RMS, attenuator 102 can be omitted. However, the attenuator permits greater flexibility with respect to the input signal level.

Typically, the AC input signal is supplied at terminal 100 and transferred via coupling capacitor 101 to attenuator 102. Positioning armature 103 of the switch selects that point on the resistor-divider of attenuator 102 wherein a suitable signal level is obtained. This signal is applied to the base of transistor 105. The level of the signal supplied by armature 103 determines the conduction of transistor 105. As transistor 105 is more conductive, the potential at the collector thereof becomes relatively more positive and is applied to the base of transistor 113. Conduction by transistor 113 due to the more positive potential at the base thereof, produces a relatively negative signal at output terminal 114 which is fed back to the base of transistor 111. Similarily, when the signal applied at the base of transistor 105 is relatively positive wherein transistor 105 is less conductive, the potential at the collector thereof is relatively negative. Transistor 113 is also rendered less conductive by the negative potential which is applied at the base thereof. When transistor 113 is less conductive, the potential supplied to the base of transistor 111, as well as to output terminal 114, is relatively positive. Thus, it is seen that the output signal follows the input signal. By properly choosing the circuit components and properly setting armature 103 of the attenuator switch, a faithful reproduction of the input signal so long as the transistors are operated in the nonsaturated region.

Figure 3:
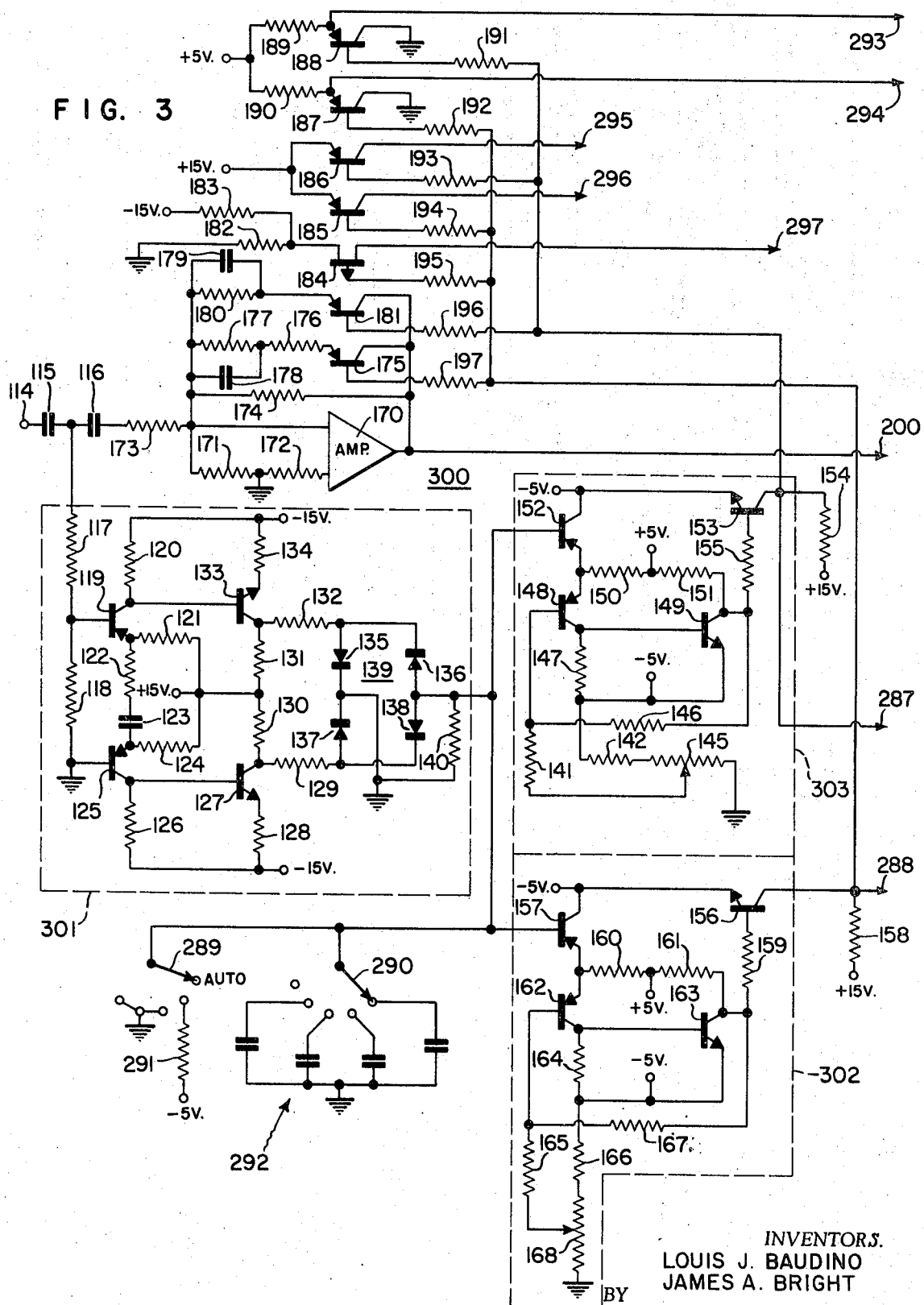
FIG. 3 is a schematic diagram of one stage of the amplifier with the associated control circuits.

Referring now to FIG. 3, there is shown AC amplifier section 300. The AC amplifier section comprises an amplifier, a level sensor, a pair of comparators, a manual gain switch and a dwell time switch. Associated switch circuits are provided for suitable output indicating purposes. Input terminal 114 is connected to one side of capacitor 115. The other side of capacitor 115 is connected to one side of capacitor 116. The other side of capacitor 116 is connected to ground via the series connected resistors 173 and 171. The common junction between resistors 173 and 171 is connected to the inverting input of amplifier 170. The noninverting input of amplifier 170 is connected to ground via resistor 172. The output of amplifier 170 is connected to output terminal 200. Output terminal 200 may be connected to the terminal which is the counterpart of terminal 114 if a succeeding AC amplifier stage is utilized. If only one stage is utilized, output terminal 200 is connected to the input of the squaring network described hereinafter.

A feedback network is provided around amplifier 170. The feedback network comprises three separate paths, each of which produces a different gain function for the amplifier. In the first path of the feedback network, resistor 174 is connected between the output and inverting input of amplifier 170. The second and third paths are substantially identical and are switchably operable. In the second path, the collector of transistor 175 is connected to the output of amplifier 170. The emitter of transistor 175 is connected to the inverting input via series connected resistors 176 and 177. Capacitor 178 is connected between the inverting input of the amplifier and the common junction between resistors 176 and 177. The base of transistor 175 is connected via resistor 197 to terminal 288 of comparator 302 as described hereinafter.

The output of amplifier 170 is further connected to the collector of transistor 181 of the third feedback path. The emitter of transistor 181 is connected to the inverting input of amplifier 170 via resistor 180. Capacitor 179 is connected in parallel with resistor 180. The base of transistor 181 is connected to output terminal 287 of comparator 303 as described hereinafter.

The common junction between adjacent sides of capacitors 115 and 116 is connected to ground via series connected resistors 117 and 118. The common junction between resistors 117 and 118 is connected to the input of a linear amplifier at the base of transistor 119. The collector of transistor 119 is connected to the base of transistor 133. The collector of transistor 119 and the emitter of transistor 133 are connected to a −15 volt source via resistors 120 and 134, respectively. The emitter of transistor 119 is connected via resistor 122 and capacitor 123 to the emitter of transistor 125. The base of transistor 125 is connected to ground. The emitters of transistors 119 and 125 are connected to a +15 volt source via resistors 121 and 124, respectively. The collector of transistor 125 is connected to the base of transistor 127. The emitter of transistor 127 and the collector of transistor 125 are connected to a −15 volt source via resistors 128 and 126, respectively.

The collectors of transistors 127 and 133 are connected to a +15 volt source via resistors 130 and 131, respectively. In addition, the collectors of transistors 127 and 133 are connected to a full wave rectifying diode bridge 139 via resistors 129 and 132, respectively. Resistors 129 and 132 represent differential outputs of the linear amplifier portion noted supra. Bridge 139 includes diodes 135, 136, 137 and 138. The anode of diode 135 and the cathode of diode 136 are connected together and to the resistor 132. The anode of diode 137 and the cathode of diode 138 are connected together and to resistor 129. The cathodes of diodes 135 and 137 are connected directly to ground while the anodes of diodes 136 and 138 are connected to ground via discharge resistor 140. In addition, the anodes of the diodes 136 and 138 are connected to the bases of transistors 152 and 157, as well as to the dwell time switch 290 and the annual gain control switch 289.

Switch 290 is a manually controlled switch whereby one of a plurality of different value capacitors 292 are selected. Each of the capacitors produces a different charging time. Operation of switch 290 changes the time constant such that the operating range of the circuit, as a function of time, is varied. Typically, the dwell time may be varied between 0.1 and 100 seconds and is determined by the value of capacitors 292 and the value of resistors 129 and 132. The capacitor 292 is used to filter the rectified signals produced by bridge 139. Switch 290 and the dwell time capacitors 292 need not be utilized. However, improved operation is permitted thereby. That is, if a fixed time constant were utilized, difficulties could be experienced at certain frequency ranges. For example, at a fixed time constant of 0.1 second, the ripple produced by a 1 CPS signal would be as large as the DC level derived. Even a 10 CPS signal would produce sufficient ripple to effect spurious switching of the comparators. Conversely, a large time constant would produce inaccuracies for a rapid change in signal amplitude.

The manual gain control switch 289 includes a plurality of terminals which are connected together in accordance with the gain function which is to be controlled. In the first gain amplifier shown in FIG. 3, one terminal is designated as auto and is not connected. In this condition, automatic gain changing will operate. Another contact is connected, via resistor 291, to a −5 volt source such that a negative signal is applied to the comparators and the range changing switch to provide a suitable signal thereto for selecting a gain range. The other terminals of switch 289 are connected to ground and are likewise supplied to the range changing switch and the comparators to inhibit certain gain ranges. Moreover, manual gain switch 289 can be omitted, if desired, without affecting the operation of the circuit significantly.

The comparators 302 and 303 are substantially similar in configuration although several components have different values wherein different amplitude signals from level sensor 301 are detected. In comparator 302, the transistors 157 and 162 are connected in differential configuration. The base of transistor 157 receives a signal from the level sensor 301 while the base of transistor 162 receives a signal from a reference supply via resistor 165. Resistor 165 controls the hysteresis in the comparator circuit. The reference supply is provided by means of variable resistor 168 which has one terminal connected to ground and the variable tap connected to resistor 168. Resistor 166 is connected between a second terminal of resistor 168 and the collector of transistor 162 via resistor 164. The common junction between resistors 166 and 164 are connected to a −5 volt source. The base of transistor 162 is connected, via resistor 167 to the collector of transistor 163. The emitter of transistor 163 is connected to the −5 volt source. The base of transistor 163 is connected to the collector of transistor 162. The collector of transistor 163 is connected to a +5 volt source via resistor 161. Resistor 160 connects the +5 volt source to the emitter of transistors 162 and 157. The collector of transistor 157 is connected to the emitter of transistor 156 and to a −5 volt source. The base of transistor 156 is connected via resistor 159 to the collector of transistor 163. A +15 volt source is connected via resistor 158 to the collector of transistor 156 and to output terminal 288 which, as noted supra, is connected to the base of transistor 175 via resistor 197.

Comparator 303 has a configuration similar to comparator 302. Transistors 152 and 148 are connected in differential configuration. Transistor 152 receives a signal from level sensor 301 while transistor 148 receives a reference signal, via hysteresis control resistor 141, from variable resistor 145 to control the trigger level of the comparator. Variable resistor 145 has one terminal connected to ground and the variable tap connected to resistor 141. The collector of transistor 148 is connected to another terminal of resistor 145 via series connected resistors 147 and 142. The common junction between resistors 147 and 142 is connected to a −5 volt source along with the emitter of transistor 149.

A + 5 volt source is connected to the base of transistor 153 via series connected resistors 151 and 155. The emitter of transistor 153 is connected to the collector of transistor 152 and to a −5 volt source. The common junction between resistors 151 and 155 is connected to the collector of transistor 149. The base of transistor 149 is connected to the collector of transistor 148. The base of transistor 148 is connected to the collector of transistor 149 and to the common junction between resistors 151 and 155. A +15 volt source is connected via resistor 154, to the collector of transistor 153 and to output terminal 287 which is connected to the base of transistor 181 via resistor 196 as noted supra.

A plurality of additional switching circuits are included in each AC amplifier section. For example, transistors 188 and 187 have the emitters thereof connected a +5 volt source via resistors 189 and 190, respectively. The collector of each of the transistors is connected to ground. The base of transistor 188 is connected via resistor 191 to output terminal 287, while the base of transistor 187 is connected via resistor 192 to output terminal 288. The emitters of transistors 188 and 187 are connected to output terminals 293 and 294, respectively. These circuits form the gain code switching circuit as described hereinafter.

Another pair of transistors, viz., transistors 185 and 186 have the emitters thereof connected together and to a +15 volt source. The collectors are connected directly to output terminals 295 and 296, respectively. The base of transistor 186 is connected via resistor 193 to output terminal 287 while the base of transistor 185 is connected via resistor 194 to the output terminal 288. These transistors supply signals to the summing amplifier described hereinafter.

Each of the amplifier sections, except the last stage, includes a "hold-off" circuit. This network includes P-channel, field effect transistor (FET) 184 which has the drain electrode thereof connected to output terminal 297 and the gate electrode thereof connected, via resistor 195, to output terminal 288. A bias potential is supplied via a voltage divider comprising resistors 183 and 182 connected between a −15 volt source and ground. The common junction of resistors 182 and 183 is connected to the source electrode of transistor 184. The FET is utilized as an interlock circuit to selectively activate the amplifier sections in a predetermined sequence as a function of gain.

In operation, a signal is applied at input terminal 114 of the circuit shown in FIG. 3. This signal is coupled to amplifier 170 via capacitors 115, 116 and resistor 173. Amplifier 170 operates upon the signal to produce an output signal at terminal 200. With full scale input, the signals appearing at output terminals 288 and 287, i.e. the signals applied to the bases of transistors 175 and 181, are negative signals on the order of −5 volts. Thus, the three feedback paths are connected in parallel around amplifier 170. Typically, the values of resistors 174, 176, 177 and 180 are arranged such that the parallel combination produces an effective feedback resistance equal to the value of resistor 173, giving a gain of 1 (0DB).

Additionally, the signal is applied, via voltage divider 117 and 118, to level sensor 301 which detects the level of the input signal. When the input signal has a sufficiently positive level or amplitude, transistor 119 is inoperative. When transistor 119 is nonconductive, transistor 133 is also rendered nonconductive such that a positive potential is applied at the common node comprising the anode of diode 135 and the cathode of diode 136. Since diode 136 is nonconductive (similarly diode 138), the level sensor produces no signal at the comparators. Therefore, the potential at the base of transistor 152 is substantially ground level. Therefore, transistor 148 conducts and transistor 152 is nonconductive. Thus, transistor 149 is nonconductive and transistor 153 is conductive.

When the amplitude of level of the input signal is sufficiently negative, transistor 119 is rendered conductive and turned on. When transistor 119 is turned on, a relatively positive potential is applied at the base of transistor 133 whereby this transistor is rendered conductive. As transistor 133 conducts, a relatively negative potential is applied via resistor 132 to the anode of diode 135 and the cathode of diode 136. Diode 135 is rendered reverse biased but diode 136 is forward biased and becomes conductive. The signal developed across diode 136 is applied to comparators 302 and 303 via the bases of transistors 152 and 157.

Thus, an AC signal is coupled to input terminal 114. As the AC signal varies, transistors 119 and 125 are alternatively conductive and nonconductive. The conduction state of transistors 119 and 125 controls the conduction states of associated transistors 133 and 127, respectively. That is, transistors 119 and 133 are each in one conduction state (for instance conductive) while transistors 125 and 127 are each in another conduction state (for instance, nonconductive). The operation of the transistors provides a double inversion such that the voltage difference across resistor 118 is amplified and reproduced between the collectors of transistors 133 and 127. Moreover, since the transistor channels are out-of-phase, bridge 139 operates as a full wave rectifier. Resistor 129 or 132 in conjunction with the selected capacitor 292, provides a filter which effects a smoothing of the rectified AC signal produced by bridge 139. The filtered substantially DC signal is supplied to transistors 152 and 157 where the signal level is compared with a reference voltage to control the gain of amplifier 170 as noted.

Through suitable arrangement of the components, the potentials at the bases of transistors 148 and 162 are such that the transistors 152 and 157 are rendered conductive in response to different levels. Thus, when the potential at input terminal 114 is above a predetermined level, 316 millivolts, RMS, for example, the signal applied at the bases of transistors 152 and 157 are sufficiently negative with respect to the reference voltage that the transistors are turned on. When transistor 152 of comparator 303 is turned on, it conducts current via resistor 150 and, effectively, "starves" transistor 148. When transistor 148 is effectively starved or nonconductive, the potential at the base of transistor 149 becomes substantially negative whereby transistor 149 is rendered nonconductive. This condition causes a positive signal to be applied to the base of transistor 153 which is turned on thereby. When transistor 153 is turned on, a −5 volt signal is applied to transistor 181 via resistor 196.

With the input signal level hereinabove similar action occurs in comparator 302. Thus, transistor 157 is conductive and transistor 162 is starved. Therefore, transistor 163 is nonconductive whereby transistor 156 is conductive and supplies a −5 volt signal to transistor 175 via resistor 197.

With −5 volt signals applied to both transistors 175 and 181, these transistors are rendered conductive. Accordingly, resistors 180, 177 and 176 associated therewith are connected in parallel with resistor 174. The net effect of the resistor parallel in the feedback of amplifier 170 is to produce a gain of 1 (0DB). This is all that is required when the input signal amplitude is sufficient magnitude.

However, when the input signal decreases somewhat, for example, to a level below 316 millivolts, RMS, but above 100 millivolts, RMS, additional gain is required of amplifier 170 to maintain the output level sufficiently large. Thus, level sensor 301 operates upon the input signal to produce the DC signal at bridge 139. The DC level is now positive (i.e. less negative) relative to the reference signal level at comparator 303. The effect of this signal is to turn off transistor 152 and, ultimately turn off transistor 153 whereby a positive signal is supplied to the base of transistor 181. Transistor 181 is thereby turned off and resistor 180 removed from the parallel feedback network. Consequently, the feedback impedance increases (while the input impedance remains constant whereby the gain of amplifier 170 is increased to 10DB.

When the input signal decreases below 100 millivolts RMS, the DC signal level across bridge 139 also decreases. Since the voltage across bridge 139 is always negative in polarity, a decrease in this voltage has the effect of supplying a more positive signal relative to the reference voltage. The further decrease in the output signal from bridge 139 causes transistor 157 to be rendered nonconductive along with transistor 152. Nonconduction by transistor 157 causes transistor 162 to be conductive. As a result, transistor 163 is turned on and transistor 156 is turned off. When transistor 156 is turned off, a positive signal is applied to the base of transistor 175. Transistor 175 is turned off whereby resistors 177 and 176 are removed from the feedback network. As noted, resistor 180 is already eliminated from the feedback network. Consequently, the feedback network comprises only resistor 174 whereby the gain of amplifier 170 is 20DB. Of course, an increase in signal level reverses this operation and reduces the gain of amplifier 170. In addition, it is understood that any cascaded amplifier stages operate similarly. For example, if the signal applied to terminal 200 is supplied to a further stage, the further stage operates thereupon to control the amplifier gain.

Figure 3A:
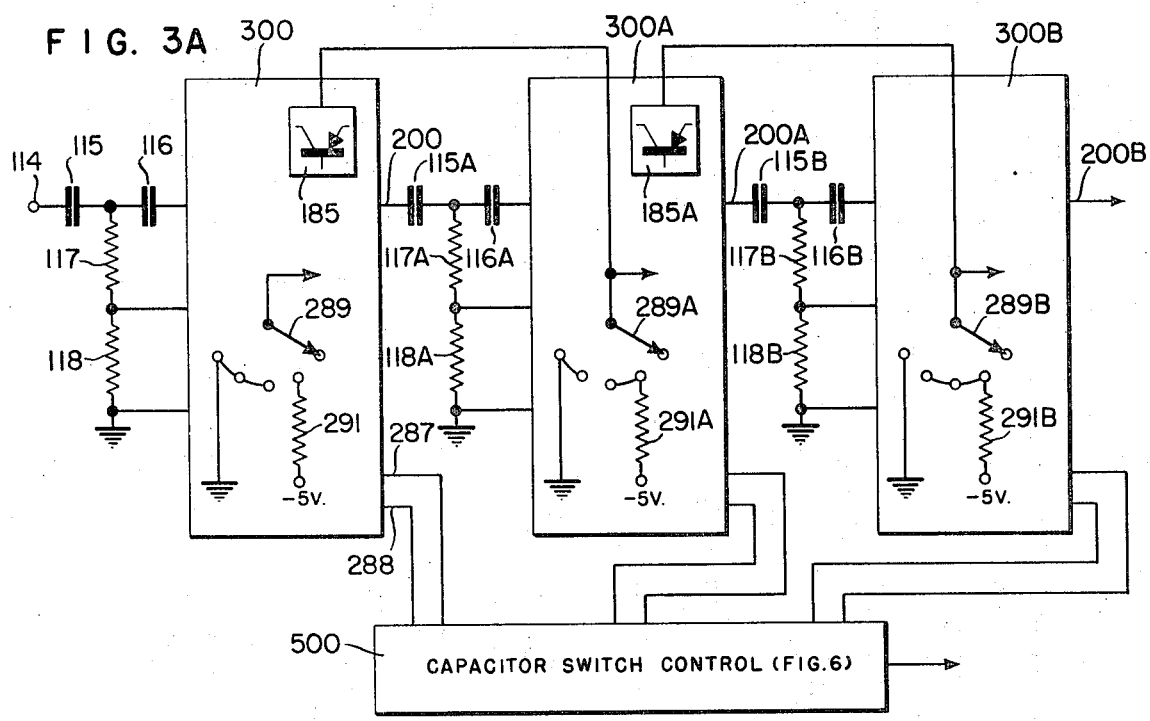
FIG. 3A is a partially block, partially schematic diagram showing the interconnection between several stages of amplifier and a manual control therein.

Referring now to FIG. 3A, there is shown a partially block, partially schematic diagram which indicates the interconnection of a plurality of AC amplifier sections. Each of the amplifier sections 300, 300A and 300B are substantially identical to the circuits shown in FIG. 3. Thus, coupling capacitors 115 and 116 are shown connected between the input terminal 114 and amplifier section 300. Counterpart capacitors 115A and 116A are connected from output terminal 200 to the input of section 300A while coupling capacitors 115B and 116B are connected from output terminal 200A to the input of section 300B.

Figure 6:
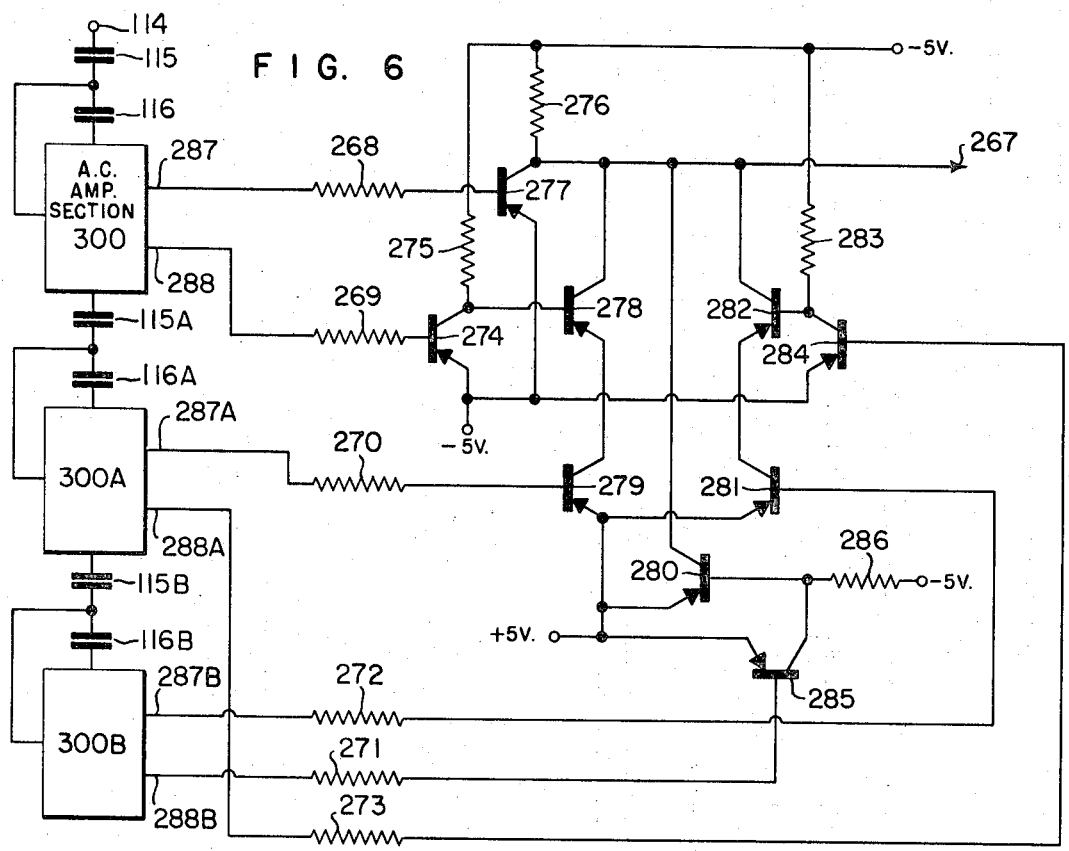
FIG. 6 is a schematic diagram of the capacitor switch control circuit.

Voltage dividers comprising resistors 117 and 118; 117A and 118A; and 117B and 118B are connected between the common junction of the coupling capacitors and ground with the voltage divider taps connected to inputs of the respective amplifier sections, specifically the level sensor portions. Similarily, output terminals 287 and 288; 287A and 288A; and 287B and 288B are connected to the capacitor switch control circuit 500 which is shown in FIG. 6.

The purpose of FIG. 3A is to show the interconnection of the interlock circuits which include transistors 185 and 185A in amplifier sections 300 and 300A. Section 300B does not need an interlock circuit inasmuch as it is normally the last stage to be sequenced under normal operating conditions. Additionally, the manual gain control switch in each of the AC amplifier sections is connected somewhat differently in order to provide different gain settings. As shown in FIG. 3, switch 289 has three contacts connected to ground, one contact connected to a −5 volt source via resistor 291 and the "Auto" terminal disconnected. This switch connection is shown in FIG. 3A in amplifier section 300.

In amplifier section 300A, the switch connection is somewhat different inasmuch as the armature of switch 289A is connected to the analogue circuit including amplifier transistor 185 in amplifier section 300. Additionally switch 289A has two contacts connected to ground with two contacts connected via resistor 291A to the −5 volt source. The "Auto" contact is again disconnected.

Similarly, in amplifier section 300B, the armature of switch 289B is connected to the interlock circuit which includes transistor 185A. At switch 289B, only one contact is connected to ground while three contacts are connected via resistor 291B to a −5 volt source. Again, the "Auto" contact is disconnected.

Thus, it is seen that each of the contacts of switch 289 represents a gain function. For example, in a clockwise direction, the first contact is the auto range contact wherein the gain function operates automatically. Thus, the contact in each of the switches 289 and the counterpart switches 289A and 289B are disconnected. Likewise, in each of these switches, the first contact represents a 10DB gain, the second contact represents a 20DB gain, the third and fourth contacts represent 40 and 60 DB gains, respectively. With the interconnections of the circuit contacts as shown, specific control over the gain function is provided. Thus, by setting the switches 289, 289A and 289B, to desired levels, the gain function of the circuit is controlled.

It is understood of course that utilization of three amplifier sections is exemplary only and is not limitative. A single amplifier section may be utilized or a plurality thereof, if so desired. FIG. 3A shows the interconnection between three amplifier sections which are used in a preferred embodiment of the instant invention.

Figure 4:
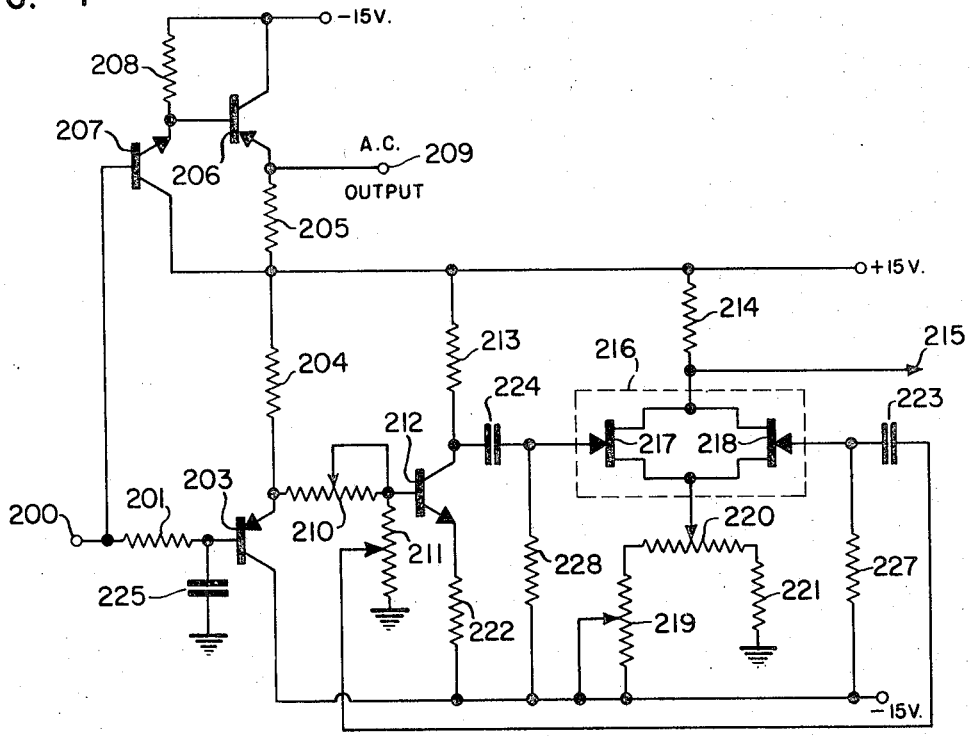
FIG. 4 is a schematic diagram of the square network.

Referring to FIG. 4, there is shown a squaring circuit for producing a signal which is proportional to the square of the AC input. As well, there is shown a network which produces an AC output signal.

Input terminal 200 is connected to the output of the last stage of the AC amplifier network. As noted, one or more amplifier stages may be utilized. Input terminal 200 is connected to the base of NPN transistor 207. The emitter of transistor 207 is connected to the base of PNP transistor 206.

The emitter of transistor 207 is further connected via resistor 208 to a −15 volt source along with the collector of transistor 206. The collector of transistor 207 is connected directly to a +15 volt source. The emitter of transistor 206 is connected, via resistor 205, to the +15 volt source and, as well, directly to output terminal 209. Transistors 207 and 206 provide an emitter follower network wherein the AC amplifier is isolated from any external loading which occurs. The emitter follower network can be omitted since it is not essential to most applications of the subject invention.

Terminal 200 is further connected via coupling resistor 201 to the one side of capacitor 225 to provide a low pass filter. The other side of capacitor 225 is connected to ground. The low pass filter limits the bandwidth of the AC signal and can be omitted if desired. Resistor 201 is further connected to the base of transistor 203. The emitter of transistor 203 is connected to a +15 volt source via resistor 204 while the collector of transistor 203 is connected directly to a −15 volt source.

The emitter of transistor 203 is connected via a variable resistor 210 to the base of transistor 212. Also connected to the base of transistor 212 is variable resistor 211 which is further connected to ground. Resistor 211 is connected in series with variable resistor 210 to provide a suitable potential at the base of transistor 212.

The emitter of transistor 212 is connected to a −15 volt source via resistor 222. The collector of transistor 212 is connected to a +15 volt source via resistor 213. The emitter is additionally connected via coupling capacitor 224 to the gate electrode of field-effect transistor 217. The gate electrode of FET 217 is connected to the −15 volt source via resistor 228. A further field-effect transistor 218 has the source electrode thereof connected with the source electrode of FET 217. Likewise, FET's 217 and 218 have the drain electrodes connected together. The drain electrodes are connected via resistor 214 to the +15 volt source as well as to output terminal 215. The source electrodes are connected to the variable tap of variable resistor 220. One end of variable resistor 220 is connected to ground via resistor 221 while the other end of resistor 220 is connected to the −15 volt source via variable resistor 219. The gate electrode of FET 218 is connected to the −15 volt source via resistor 227. Additionally, the gate electrode of FET 218 is connected via coupling capacitor 223 to the variable tap of variable resistor 211, noted supra. A component oven or temperature regulating device 216 is shown in dashed line. It is desirable to mount the FETs in a temperature controlling device such as an oven in order to avoid temperature variations which cause variations in the operating characteristics of the components.

In operation, the AC signal is applied to the base of transistor 203 which operates as an emitter follower. The signal provided by transistor 203 is supplied across the potential divider network comprising resistors 210 and 211. Adjustable resistor 210 is utilized to adjust the signal level as applied to the FET squaring network. Resistor 211 has a potential drop thereacross which is applied to the base of transistor 212. Transistor 212 is a coupling transistor which applies a signal to capacitor 224. Capacitor 224 couples the AC signal from transistor 212 to the gate electrode of FET 217. Similarly, capacitor 223 couples a portion of the AC signal detected across resistor 211 to the gate electrode of FET 218. It is noted that resistors 227 and 228 are similar wherein the DC potentials supplied to the gate electrodes of the FETs are equal. In addition, by adjustment of resistors 219 and 220, a 0 voltage condition at the drain electrodes of the FETs is achieved, when no AC input signal is applied.

It will be seen that transistor 212, in conjunction with resistor 211, provides a phase splitting network. That is, a substantially negative signal at the base of transistor 203 renders this transistor more-conductive. Consequently, a relatively negative potential is supplied at the base of transistor 212. Transistor 212 is, therefore, less conductive such that a positive potential is supplied to capacitor 224. Concurrently, a relatively negative potential is applied across resistor 211 and to capacitor 223. Thus, the potential supplied to the gate electrodes of FETs 217 and 218 are of relatively opposite polarity. It is seen that a positive signal at the base of transistor 203 will cause the signal conditions which exists at the gate electrodes of FETs 217 and 218 to be reversed. The phase splitter and squaring network is designed such that the signal developed across resistor 214 and applied to output terminal 215 by the squaring network is twice the frequency of the input AC signal superimposed upon a negative DC signal level which is proportional to the square of the AC input. This signal is supplied to the averaging circuit.

Figure 5:
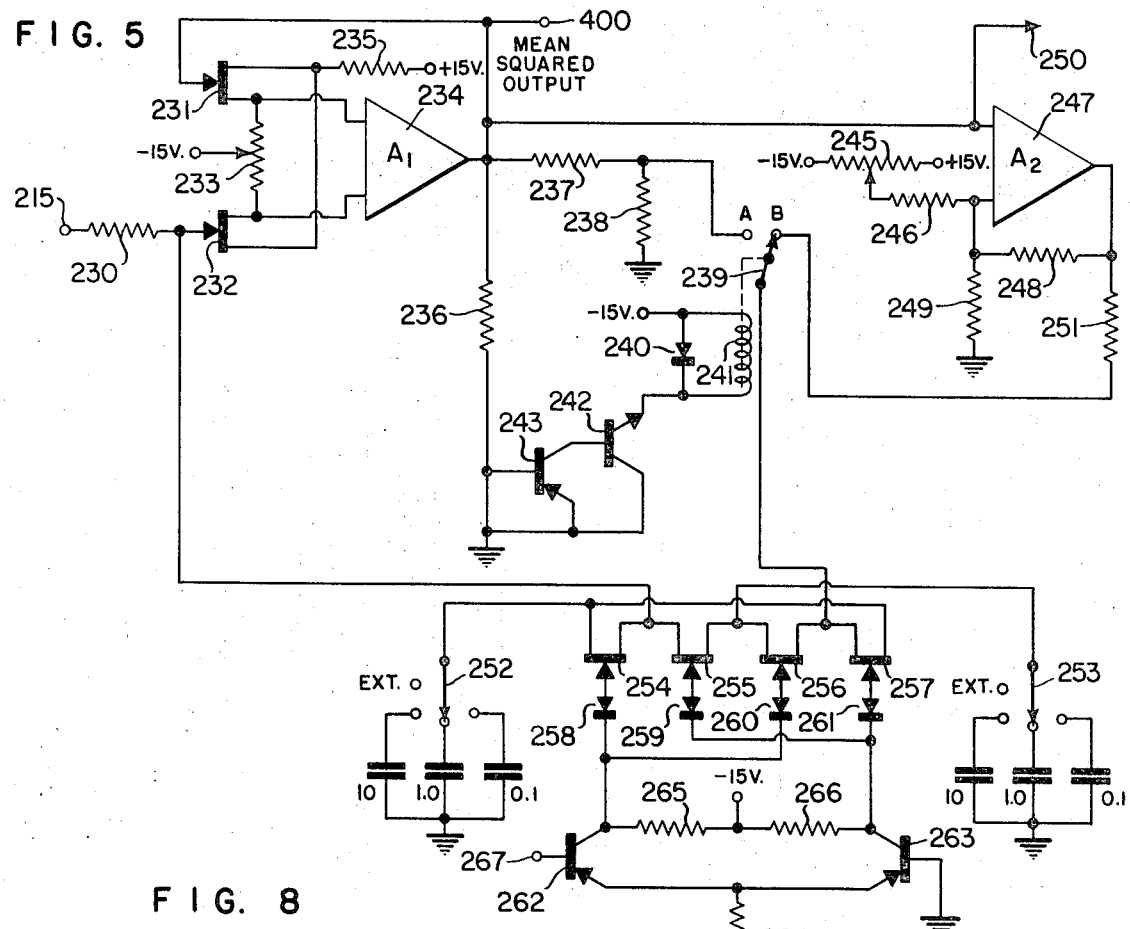
FIG. 5 is a schematic diagram of the averaging network.

Referring now to FIG. 5, there is shown a schematic diagram of the averaging circuit. The output signal from the FET squaring network is applied to input terminal 215. Input terminal 215 is connected to the gate electrode of FET 232 via filter resistor 230. The drain electrode of FET 232 is connected directly to the drain electrode of FET 231. The drain electrodes are connected through common resistor 235 to a +15 volt source. The source electrodes of FET 231 and 232 are connected together via variable resistor 233. The variable tap of resistor 233 is connected to a −15 volt source. The source electrodes of FET 231 and 232 are further connected to the inverting and noninverting inputs, respectively, of amplifier 234. The output of amplifier 234 is fed back to the gate electrode of FET 231. Additionally, the output of amplifier 234 is connected to the Mean Squared Output terminal 235.

A voltage divider network comprising resistors 237 and 238 is connected between the output of amplifier 234 and a reference potential, for example ground. In a preferred embodiment, the voltage divider has a 10:1 dividing ratio. The common junction between resistors 237 and 238 is connected to contact A OF SWITCH 239 where switch 239 may be a relay.

Resistor 236 is connected between the output of amplifier 234 and the base of transistor 243. The base of transistor 243 is connected to ground. The collector of transistor 243 is connected to the base of transistor 242. The collector of transistor 242 and the emitter of transistor 243 are connected together and to ground. The emitter of transistor 242 is connected to one terminal of coil 241 which is the coil associated with switch 239. Another terminal of coil 241 is connected to a −15 volt source. Diode 240 is connected in parallel with coil 241 and has the anode thereof connected to the −15 volt source.

The output of amplifier 234 is also connected to the noninverting input of amplifier 247 and to output terminal 250. The inverting input of amplifier 247 is connected to one terminal of resistor 246. The other terminal of resistor 246 is connected to the variable tap of resistor 245. Resistor 245 is a variable resistor connected between a −15 volt source and a +15 volt source. Resistors 245 and 246 provide zero control for amplifier 247 and operate as a current source therefrom. Resistors 248 and 249 are connected between the output of amplifier 247 and ground. The junction between resistors 248 and 249 is connected to the inverting input of amplifier 247 to provide a typical feedback network. Resistor 251 is connected from the output of amplifier 247 to contact B of switch 239.

FET's 254, 255, 256 and 257 are connected together in series. That is, the drain electrodes of FETs 254 and 255 are connected together as are the drain electrodes of FETs 256 and 257. A connection exists between the source electrodes of FETs 255 and 256 as well as between the source electrodes of FETs 254 and 257. The common junction between the drain electrodes of FETs 254 and 255 are connected to input terminal 215 via filter resistor 230. The drain connection between FETs 256 and 257 are connected to the armature of switch 239. The source connection between resistors 255 and 256 is connected to the armature of switch 253. The connection between the source electrodes of FETs 254 and 257 is connected to the armature of switch 252. The contacts of switches 252 and 253 are connected to identical capacitor clusters which are referenced to ground. Thus, through ganged operation, switches 252 and 253 can selectively connect with each of the capacitors associated therewith and the same value capacitor in each cluster is utilized.

The gate electrodes of each of the FETs 254 through 257 are connected to the anode of an associated diode. The cathodes of diodes 258 and 260 (which are associated with FETs 254 and 256, respectively) are connected together and to the collector of transistor 262. Similarly, the cathodes of diodes 259 and 261 (which are associated with FETs 255 and 257, respectively) are connected together and to the collector of transistor 263. The collectors of transistors 262 and 263 are connected to a −15 volt source via balanced resistors 265 and 266, respectively. The emitters of transistors 262 and 263 are connected together and to a +15 volt source via common resistor 264. The base of transistor 263 is connected directly to a reference source, for example ground. The base of transistor 262 is connected via terminal 267 to the capacitor control network described hereinafter. Transistor 262 is selectively switched by signals from the capacitor control network which signals are function of the capacitor circuits in the AC amplifier sections.

The output signal from the FET squarer is normally from −0.1 to −1.0 volts and are coupled to the averager network. The averager is a low pass RC filter consisting of resistor 230 and that one of the capacitors which are connected in series with the resistor by switch 252 or 253 as the case may be. The significance of the capacitor connected by switch 252 or 253 is determined by the FETs 254—257. The FETs are controlled by the signal supplied at terminal 267 as will appear hereinafter.

A matched pair of FETs 231 and 232 are connected as source followers which follow the signal supplied at terminal 215. The FETs eliminate loading on the high impedance filter. As noted, the signal supplied at terminal 215 varies between −0.1 and −1.0 volts. Initially, switch 239 is connected with contact B in the normally closed position. When a −0.1 volt signal is applied at terminal 215, the signal is transmitted via resistor 230 and FET 232 to the noninverting input of amplifier 234. Amplifier 234 operates on the signal supplied thereto and produces an output signal of −0.1 volts. This signal is applied to the voltage divider comprising resistors 237 and 238 and is divided by 10. However, inasmuch as contact A is not connected, this signal is immaterial.

The output signal from amplifier 234 is also applied to the base of transistor 243. However, since the signal is only −0.1 volts, transistor 243 remains nonconductive such that there is no circuit action by transistor 242 or coil 241.

The −0.1 volt signal is applied to the noninverting input terminal of amplifier 247. The signal is amplified by a factor of 10 and supplied via resistor 251 to contact B of switch 239. This signal, which is now −1.0 volts, is applied to the source-drain connection of FETs 256 and 257.

In the alternative, when a −1.0 volt signal is applied at terminal 215, amplifier 234 provides a signal of −1.0 volts at the output thereof. This signal is applied to the base of transistor 243 rendering the transistor conductive. When transistor 243 is conductive, a relatively positive signal is applied at the base of transistor 242 wherein this transistor is rendered conductive. When transistor 242 is conductive, current flows therethrough to the −15 volt source via coil 241. When coil 241 is thus energized, the armature of switch 239 is moved into contact with terminal A. Thus, the output signal from amplifier 234 is applied to the 10:1 voltage divider comprising resistors 237 and 238 such that a −0.1 volt signal is applied at contact A. This signal is applied via the armature of switch 239 to the drain connection of FETs 256 and 257.

Concurrent with either of these operations, the input signal supplied at terminal 215 is supplied at the drain connections of FETs 254 and 255. Thus, when the input signal is −0.1 volts, a signal of this magnitude appears at FETs 254 and 255 while a signal of −1.0 volt appears at the drain connection of FETs 256 and 257. Contrariwise, when the input signal is −1.0 volts, this signal appears at the drain connection of FETs 254 and 255 while a −0.1 volt signal appears at the drain connection of FETs 256 and 257. Thus, it is apparent that the signal condition supplied by the input and by switch 239 are mutually of relatively opposite polarity. Consequently, only one of the FET pairs can be conductive.

Which of the FET pairs is conductive is, of course, controlled by the operation of transistors 262 and 263. That is, whichever of these transistors is conductive, is effective to provide a clamping voltage at the associated diodes 258 and 261 such that the FETs associated with the clamped diode are nonconductive.

For example, if a negative signal is applied at input terminal 267, transistor 262 is conductive and applies a positive signal at the cathode of diodes 258 and 260. These diodes are then nonconductive. If transistor 262 is conductive, transistor 263 is rendered nonconductive because of the common emitter source and the differential configuration.

Thus, assuming a −1.0 volt signal input at terminal 215 and a negative signal at terminal 267, FETs 254 and 256 are conductive while FETs 255 and 257 are nonconductive. However, as noted FET 254 is connected via switch 252 to one of the capacitors in the associated cluster. That capacitor which is selected by switch 252 is charged to a −1 volt potential. The time period for the charging is, of course, a function of the value of the capacitor. On the other hand, the −0.1 volt signal is applied from switch 239 via FET 256 and switch 253 to a corresponding capacitor in the other cluster. This second capacitor is charged to a −0.1 volt potential. Thus, it is seen that while one capacitor is being charged to a signal potential as a function of the input signal, the corresponding capacitor in the other cluster is charged to the conditioning level, namely the opposite level of the input signal, and is prepared for change of signal level from the squarer circuit. The Mean Squared Output signal is detected at output terminals 235 and 250. Terminal 235 is a direct output while terminal 250 is used to apply the signal to the log converter.

Referring now to FIG. 6, there is shown the switch control circuit for the capacitors shown in the averager circuit of FIG. 5. The circuit of FIG. 6 is used to control the operation of the trigger transistors 262 (FIG. 5) by means of the signal applied at the terminal 267. In FIG. 6, there are shown blocks 300, 300A and 300B designating separate AC amplifier sections similar to those shown in FIG. 3. The first section is connected to terminal 114 of the buffer amplifier via the coupling capacitors 115 and 116. The junction of the coupling capacitors is connected to the inverting amplifier as shown in FIG. 3. The output terminals for each of the sections are connected to the control circuit. Thus, resistor 268 couples terminal 287 to the base of transistor 277. Resistor 269 couples terminal 288 to the base of transistor 274. Resistor 270 couples terminal 287A to the base of transistor 279. Resistor 271 couples terminal 288A to the base of transistor 285. Resistor 272 couples terminal 287B to the base of transistor 281. Resistor 273 couples terminal 288B to the base of transistor 284.

The collector of transistor 274 is connected to a −5 volt source via resistor 275. The emitter of transistor 274 is connected to a +5 volt source and to the emitters of transistors 277 and 284. The collector of transistor 277 is connected, via resistor 276, to the −5 volt source. The emitter of transistor 278 is connected to the collector of transistor 279. The collector of transistor 278 is connected to the emitter of transistor 277 and to output terminal 267. The emitter of transistor 279 is connected to the emitter of transistors 280, 281 and 285 as well as the +5 volt source. The collector of transistor 285 is connected to the base of transistor 280, via resistor 286, to the −5 volt source. The collector of transistor 280 is connected to output terminal 267. The collector of transistor 281 is connected to the emitter of transistor 282. The collector of transistor 282 is connected to output terminal 267. The base of transistor 282 is connected to the collector of transistor 284 and, via resistor 283, to the −5 volt source.

Initially, it is assumed that the voltage applied to each of the comparators in AC sections 300 is less than the reference voltage. Consequently, each of the comparators produces a −5 volt output signal at terminals 287, 288 and the counterpart terminals. The −5 volt signal is applied to the base of transistors 274, 277, 279, 281, 284 and 285. Each of these transistors is rendered conductive. Transistor 277, when conductive, produces a +5 volt potential at the collector thereof and, thus, at output terminal 267. Transistor 274, while conductive, produces a +5 volt potential at the base of transistor 278 rendering the latter transistor nonconductive. Similarly, when transistor 284 is conductive transistor 282 is rendered nonconductive. Thus, the conduction or not of transistors 279 and 281 are relatively immaterial at this condition. Again, when transistor 285 is conductive, transistor 280 is rendered nonconductive. Thus, only transistor 277 supplies a +5 volt signal at output terminal 267 at 0DB gain.

When the signal produced by the first comparator is greater than the reference, the signal produced at terminal 287 is +5 volts. This signal renders transistor 277 nonconductive. Consequently, a −5 volt signal is exhibited at the emitter of transistor 277 and at terminal 267, which signal is indicative of 10DB gain. That is, all other transistors produce −5 volt signals at output terminal 267 and no change is effected in the operation thereof.

When the voltage applied at the second comparator is greater than the reference voltage, the signal at terminal 288 also switches to +5 volts. The second +5 volt signal is applied at the base of transistor 274 thereby rendering this transistor nonconductive. Consequently, a −5 volt signal is applied at the base of transistor 278 rendering this transistor conductive. Transistors 279 and 278, in series, are both conductive and produce a +5 volt signal at output terminal 267 indicative of 20DB gain.

The operation at each of the amplifier sections continues such that each of the comparators produces a +5 volt signal when compared voltage is greater than the reference voltage. The +5 volt signals are generated at the terminals at the outputs of amplifier sections. Thus transistors 284, 281 and 285 are turned off in turn. It will be seen that as each of these transistors is turned off the signal at output terminal 267 switches from +5 volts to −5 volts. That is, each switch effected by a comparator causes a voltage change at output terminal 267. Each voltage change at output terminal 267 represents an additional 10DB gain change and causes transistor 262 to be alternatively turned on or turned off thereby affecting the conduction of the FETs 254 through 257. As the conduction of the FETs are affected, the capacitor cluster associated with switch 252 or 253 is charged to the signal condition or to the preparatory condition as the case may be.

Figure 7:
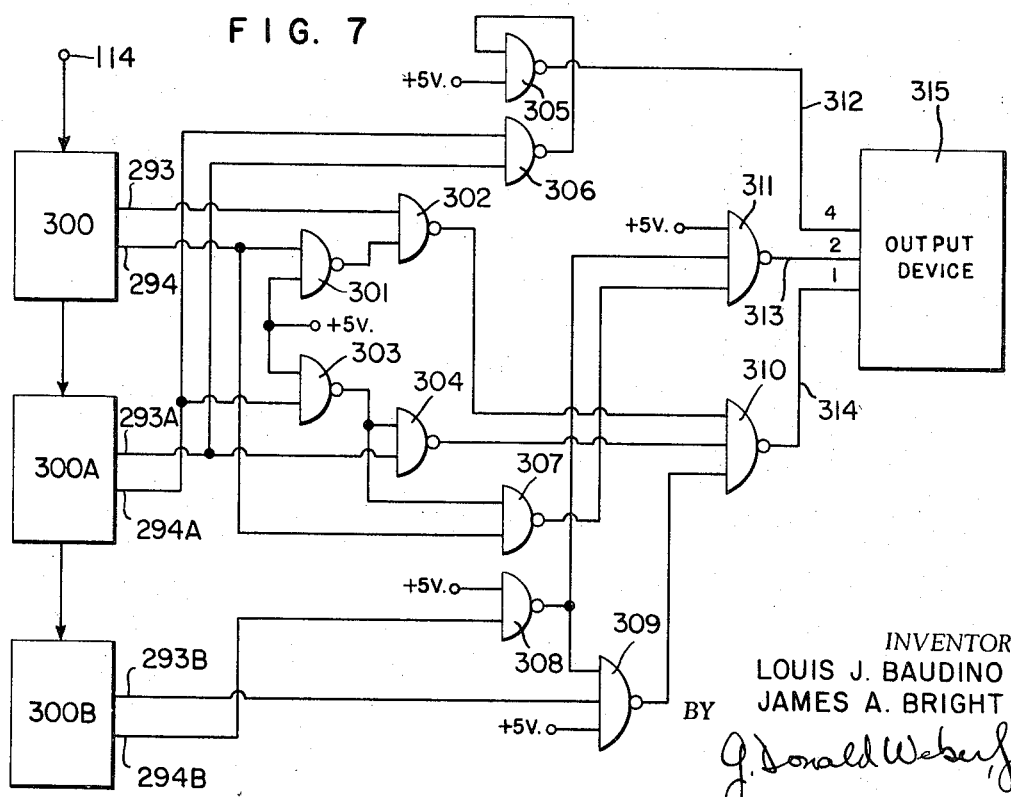
FIG. 7 is a block diagram of the input logic control circuit.

Referring now to FIG. 7, there is shown a digital logic circuit which indicates the gain status of the circuit. The AC amplifier sections provide signals which are operated upon to indicate the gain status. The AC amplifier 300 and similar devices 300A and 300B are shown, generally, connected in cascade. Input signals are provided at input terminal 114. The output terminals 293 and 294 and the counterparts thereto bearing the suffixes A or B, are connected to the gain code logic.

A plurality of gates are shown. Each of these gates is a NAND gate which requires that all input signals thereto be of relatively high or positive in order to produce a low or relatively negative output signal. The gates are interconnected so as to produce signals at the utilization device 315 which may typically be a computer interface or a code converter which drives a set of lights. The signals supplied to the utilization device 315 are in binary-coded-decimal form.

In the preferred embodiment, gates 301 and 303 each have one input connected to a +5 volt source which thereby supplies an enabling signal. The other input of gate 301 is connected to terminal 294 of AC amplifier 300 along with an input of a gate 307. The other input of gate 303 is connected to the counterpart terminal 294A of AC amplifier section 300A along with an input of gate 306. A further input of gate 307 is connected to the output of gate 303 along with an input to gate 304. The output of gate 301 is connected to one input of gate 302. A further input of gate 302 is connected to output terminal 293 of AC amplifier section 300. The counterpart terminal 293A of amplifier section 300A is connected to a further input of gate 304 as well as to a further input of gate 306. The output of gate 306 is connected to one input of gate 305. Another input of gate 305 is connected to a +5 volt source which provides an enabling signal thereto. The output of gate 305 is connected along line 312 to utilization device 315 and provides the "4" output signal thereto.

The output terminal 294B of AC amplifier 300B is connected to one input of gate 308. A further input of gate 308 is connected to a +5 volt source to receive an enabling signal. The output signal from gate 308 is connected to one input of gate 309 and one input of gate 311. Each of gates 309 and 311 has a further input connected to the +5 volt source which provides the enabling signal thereto. Gate 309 has a further input connected to output terminal 293B of AC amplifier section 300B. The third input of gate 311 is supplied by the output of gate 307. The output of gate 311 is connected as the "2" output along line 313 to utilization device 315.

Gate 310 has three inputs. The inputs are supplied by gates 302, 304 and 309, respectively. The output of gate 310 provides the "1" signal along line 314 to utilization device 315.

As described supra, the signal supplied at output terminals 293 and 294 and the counterpart terminals are typically zero volts until the particular gain function associated therewith is provided. When the gain function is provided, the output is a +5 volt signal. Thus, each of the signals supplied by amplifier section 300, 300A and 300B is a low level or zero volt signal such that each of the gates (except gates 305, 310 and 311) has at least one low level (hereinafter designated negative) signal supplied thereto and produce positive output signals. However, all of the input signals at gates 305, 310 and 311 are positive wherein negative output signals are produced. The negative signals are supplied to utilization device 315 and give no output indication.

When the gain function is such that a 10DB gain is indicated, terminal 293, supplies a positive signal. This signal is supplied to one input of gate 302. The other input of gate 302 is a positive signal from gate 301 which has a negative signal applied by terminal 294. The "all positive" input condition at gate 302 produces a negative output signal which is supplied to one input of gate 310. Gate 310 immediately switches to produce a positive output signal which is indicative of a "1" on line 314. Thus, 10DB gain increment has been achieved. No other changes occur in the circuit inasmuch as the input signals remain negative (except at terminal 293) and the signals applied at terminal 293 and at the output of gate 302 do not effect any other circuitry.

As the gain function increases to indicate 20DB gain, the +5 volt signal continues at output terminal 293 and is further supplied by terminal 294. The positive signal at 294 is applied at one input of gate 301. The other input of gate 301 is connected to the enabling +5 volt source. The "all positive" conditions at the inputs of gate 301 produce a negative output signal. This negative signal is applied to an input of gate 302 which, in spite of the positive signal supplied at terminal 293, now produces a positive signal which is supplied to gate 310. In view of the "positive" input conditions at gate 310, the output thereof switches to a negative signal wherein no signal appears on line 311.

The positive signal at terminal 294 is also applied to one input of gate 307. Gate 307 further receives a positive input from gate 303 which has a negative input supplied by terminal 294A. In view of the all positive input condition, gate 307 produces a negative output signal which is applied at one input of gate 311. Gate 311, because of the negative input signal, switches and produces a positive output signal which is applied along line 313 to utilization device 315.

When the gain circuitry of the AC amplifier indicates a gain function of 30DB, positive signals are supplied at terminals 293, 294 and 293A. A positive signal is now applied to second input of gate 304. Since all of the input signals are positive, the output supplied by gate 304 is negative which causes gate 310 to produce a positive output signal. As noted previously, the positive signals at terminals 293 and 294 produce a positive signal at the output of gate 311. Thus, a "1" and a "2" signal are supplied along lines 314 and 313, respectively, to utilization device 315.

With the indication of a 40DB gain function, a positive signal is supplied at terminal 294A. Thus, gate 303 has all positive signals applied thereto and produces a negative output signal. Gate 304, thus, receives a negative input and produces a positive output signal. Additionally the inputs supplied to gate 306 are all positive whereby a negative output signal is supplied. Gate 305, in response to a negative input signal, produces a positive output which is supplied along line 312 to produce a "4" output signal.

Gates 311 and 310 produce low level signals inasmuch as each of the input signals supplied thereto is a positive signal. Gate 311, receives a positive input signal from gate 307 inasmuch as the output of gate 303 is a negative signal which is applied to gate 307. The positive signals supplied to gate 310 are produced by gate 302 which receives a negative signal from gate 301; from gate 304 which receives a negative signal from gate 303; and from gate 309 which receives a negative signal from gate 293B.

When a gain of 50DB is indicated, terminal 293B produces a positive signal. This signal is supplied at the input of gate 309. Gate 309 receives a positive input from gate 308 which has a negative input supplied by terminal 294B. The signal at terminal 293B is positive as is the enabling signal supplied by the +5 volt source. Gate 309 produces a negative signal which causes gate 310 to produce a positive signal. The previously noted signal conditions continue to generate a positive signal on line 312 whereby a "1" and a "4" signal are supplied along lines 314 and 312, respectively. When a 60DB gain is indicated, terminal 294B produces a positive signal. The positive signal is supplied to the input of gate 308 along with the enabling signal supplied by the +5 volt source. Gate 308, therefore, produces a negative signal which causes gate 309 to produce a positive signal. This positive signal is applied to gate 310 and causes gate 310 to produce a negative signal along line 314. In addition, a negative signal from gate 308 is applied at an input of gate 311 thereby producing a positive output signal along line 313. Thus, a "4" and "2" signal are supplied along lines 312 and 313, respectively.

The circuit configuration shown operates to indicate up to six gain function changes. If additional amplifier sections are utilized, further gating arrangements can be utilized to maintain a greater count range. Moreover, all of the range information is displayed in a suitable utilization device 315 such as a binary-to-decimal converter which drives Nixie tubes or the like.

Figure 8:
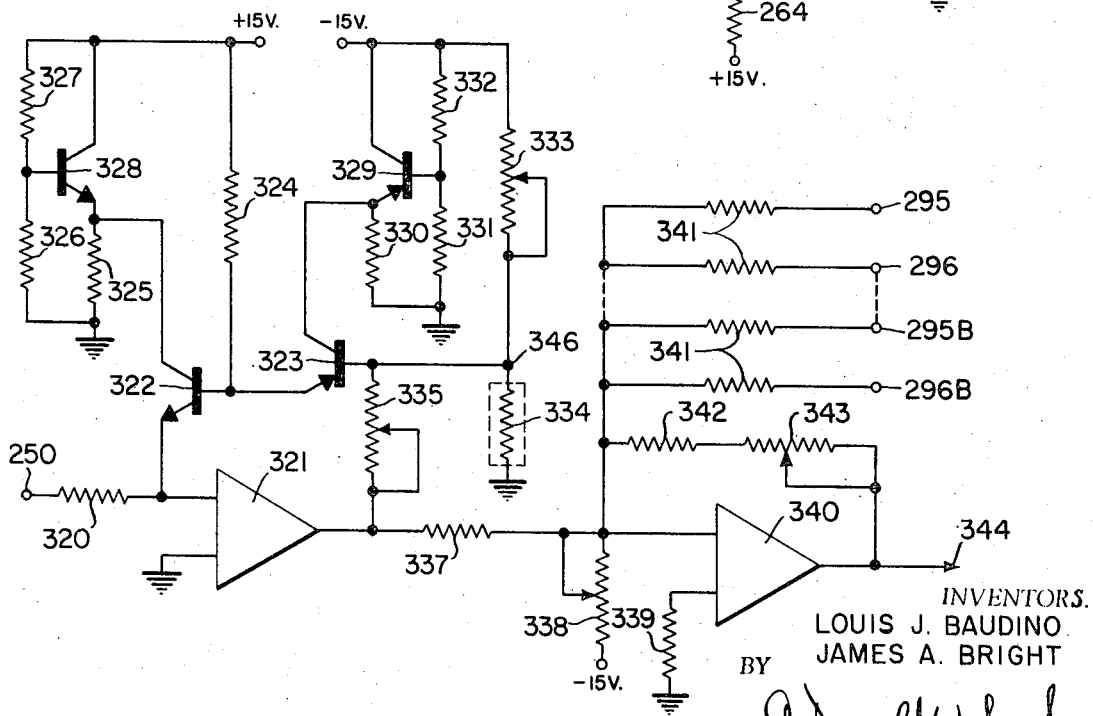
FIG. 8 is a schematic diagram of the log converter network and the output attenuator and amplifier.

Referring now to FIG. 8, there is shown a log converter circuit. Input terminal 250 is connected via resistor 320 to the inverting input of amplifier 321. The noninverting input of amplifier 321 is connected to a suitable reference potential, for example ground. The output terminal of amplifier 321 is connected to the base of transistor 323 via variable resistor 335. This resistor controls the base current for transistor 323. The base of transistor 323 is further connected to ground via a temperature sensitive resistor 334. The collector of transistor 323 is connected to the emitter of transistor 329. The emitter of transistor 329 is connected to ground via resistor 330. A bias network comprising resistors 331 and 332 is connected between the collector of transistor 329 and ground. The common junction between the resistors is connected to the base of transistor 329. Resistor 333 is connected between the collector of transistor 329 and the base of transistor 323. Resistor 333 in conjunction with resistor 334, provides a temperature compensated bias at the base of transistor 323. Variable resistor 333 provides adjustment of the potential values.

The emitter of transistor 323 is connected to the base of transistor 322. The emitter of transistor 322 is connected to the inverting input of amplifier 321. The collector of transistor 322 is connected to the emitter of transistor 328 which is further connected to ground via resistor 325. The collector electrode of transistor 328 is connected to the base of transistor 322 via resistor 324. A bias network comprising resistors 326 and 327 is connected between the collector of transistor 328 and ground. The common junction between resistors 326 and 327 is connected to the base of transistor 328.

The output of amplifier 321 is also connected to the inverting input of amplifier 340 via summing resistor 337. The noninverting input of amplifier 340 is connected via resistor 339 to ground. The output terminal of amplifier 340 is connected to output terminal 344 at which the DC log signal is detected. A feedback path comprising resistor 342 and series connected variable resistor 343 is connected between the output of amplifier 340 and the inverting input thereof. Variable resistor 338 is connected from a suitable reference source to the inverting input of amplifier 340. A fixed offset voltage is provided across resistor 338 to produce zero output volts at full scale input. Terminals 295 and 296 (along with the counterpart terminals) of the AC amplifier sections are each connected to a separate resistor 341. Each of the resistors are identical and are connected to the inverting input of amplifier 340. Thus, the output signals from the AC amplifier sections 300, 300A, 300B (and the like) are summed with the log converter output, i.e. output of amplifier 321, at the input of amplifier 340.

In operation, a signal Ein supplied to amplifier 321 via resistor 320. A current is developed through resistor 320 which is a function of the input voltage divided by the resistance of resistor 320. This relationship obtains inasmuch as the summing point of amplifier 321 is a virtual ground. Ideally, amplifier 321 draws no current. Consequently, the input current through resistor 320 must flow through transistor 322 such that the input current $I_{in}$ equals the emitter current $I_{E1}$ in transistor 322. This emitter current produces a base-emitter voltage across transistor 322 which voltage is proportional to the logarithm of the emitter current, viz, $\log I_{E1}$.

Transistor 323 forms an emitter follower circuit. Transistor 323 is biased to produce an emitter current $I_{E2}$ which is equal in magnitude to the maximum input current $I_{in}$. Emitter current $I_{E2}$ is much larger than the base current $I_{E1}$ produced by transistor 322. Thus, as $I_{1N}$ (as well as the base-emitter voltage of transistor 322) changes, the base-emitter voltage of transistor 323 remains substantially constant.

Typically, transistors 322 and 323 are matched for substantially equal base-emitter voltage when the emitter currents thereof are equal. Thus, a maximum input current, the base-emitter voltage of transistor 322 is canceled by the base-emitter voltage of transistor 323 and point 346 is at substantially zero volts. When the input current is less than the maximum, the base-emitter voltage of transistor 323 is larger than the base-emitter voltage of transistor 322 so that the voltage at point 346 is equal to the difference therebetween. Since the change in the base-emitter voltage of transistor 322 is proportional to the logarithm of the input current, the voltage at point 346 is also proportional to the logarithm of the input current.

The voltage change at point 346, in response to an input current change, causes a current change $\Delta I_s$ in the resistance network comprising resistor 334. This current change is defined by the relationship of the voltage change at point 346 divided by the resistance of temperature sensitive resistor 334. The current change through resistor 335 produces an output voltage change $\Delta E_0$ at the output of amplifier 321. The voltage change is dependent upon the ratio of the resistance of resistor 334 to the resistance of resistor 335. Thus, the system equation is given by $$E_O = -\frac{R_F}{R_T} K_1 \log \frac{E_{IN}}{R_{IN}} + K_2$$

Thus, $E_O$ is the output voltage produced by the circuit where $R_F$ is the resistance of resistor 335. $R_T$ is the resistance of resistor 334. $E_{IN}$ and $R_{IN}$ are previously defined. $K1$ and $K2$ are constants dependent upon the operating characteristic of transistor Q15 and the minus sign is produced inasmuch as amplifier 321 inverts the input signal.

Transistors 322 and 323 are carefully matched such that the emitter currents thereof, as well as the base emitter voltages of each of the transistors, is substantially equal at the maximum input current. That is, at $I_{1N} = I_{KE1}$, point 346 is at zero volts with respect to ground which permits the positive temperature coefficient resistor 334 to change with temperature. Since there is no voltage across resistor 334, no current change occurs therein and the output voltage at the output of amplifier 321 does not change. Moreover, since transistors 322 and 323 are matched, their temperature coefficients thereof are also equal and cancel the respective effects produced thereby.

When the input current $I_{IN}$ is less than the emitter current of transistor 323 (which emitter current is fixed), the temperature coefficient of transistor 322 becomes larger than the temperature coefficient of transistor 323. Under these circumstances, the voltage at point 346 changes with temperature variation. More specifically, an increasing temperature will provide a more positive potential at point 346. Resistor 334 is chosen to have a positive temperature coefficient which will change in proportion relative to the voltage at point 346. Thus, with a proper temperature coefficient for resistor 344, there is no change in the current in resistor 335 whereby the output voltage does not change with temperature.

The output signal from the log converter is selectively supplied via switch 345 and the voltage divider network, to the input of amplifier 340. Summing amplifier 340 is a standard operational amplifier. The output signals from the AC amplifier section are supplied via resistors 341. These latter signals each vary between 0 and +15v. Thus, the summation process produces a continuous output signal as a function of the 10DB increments generated by the automatic gain change. The continuous output signal is applied to output terminal 344 and is a DC log output proportional to the RMS value of the AC input.

There has thus been described a circuit for providing a DC output signal which is proportional to the true RMS value of a varying input signal. The output signal is within a dynamic range which is suitable, for example, for recording with good resolution at all levels. The output signal provides 100 millivolts per DB of input signal change. Consequently, an 80DB (10,000:1) input signal variation produces an output signal change of only 8 volts. Moreover, a 1DB change in the input signal at the millivolt level produces the same output signal change as a 1DB input signal change at the volt level.

This circuit may be incorporated into an instrument which finds great utility in the instrumentation and measuring areas of the art. It is understood that a preferred embodiment has been described and the specific recitation are illustrative only and are not meant to be limitative. Any modification falling within the inventive concept are intended to be included within this description.

We claim:

1. A signal converter comprising, input means for supplying input signals, amplifier means for operating upon said input signals, squarer means connected to said amplifier means to square the signal produced thereby, averager means connected to said squarer means for averaging the signal produced by said squarer means, log converter means connected to said averager means to convert the signal produced thereby to an electrical signal which is a logarithmic representation thereof, and output means connected to said log converter means.

2. The signal converter recited in claim 1 wherein said amplifier means includes a plurality of amplification stages, and switching means connected to said averager means to vary the operation thereof.

3. The signal converter recited in claim 1 wherein said amplifier means exhibits variable gain, level sensor means associated with said amplifier means, gain switching means associated with said amplifier means, said level sensor means connected to said input means to detect the input signal supplied thereby and to produce an output signal in response to a predetermined condition at said input means, said output signal supplied by the level sensor means being supplied to said gain switching means to affect the gain of said amplifier means.

4. The signal generator recited in claim 3 including, logic means connected to said level sensor means, said logic means producing output signals indicative of the conditions of said level sensor means.

5. The signal generator recited in claim 1 including summing amplifier means connected to said log converter means, means supplying signals from said amplifier means to said summing amplifier means to affect the signal level supplied to said summing amplifier.

6. The signal generator recited in claim 1 wherein said input means includes attenuator means for operating upon input signals, and buffer amplifier means exhibiting high input impedance and low output impedance, said buffer amplifier connected to said attenuator means.

7. The signal generator recited in claim 3 wherein said level sensor means includes, differential connected amplifier means for receiving input signals, said differential connected amplifier means exhibiting different conduction characteristics as a function of the level of the input signal supplied, rectifier bridge means connected to said differential amplifier means to conduct current therethrough as a function of the conduction characteristics exhibited by said differential connected amplifier, and switch means connected to said rectifier bridge means to be selectively rendered conductive as a function of the current conduction by said rectifier bridge means.

8. The signal generator recited in claim 7 wherein said gain switching means includes a plurality of switching devices connected in parallel with a fixed gain amplifier, each of said switching devices connected to said switch means to be selectively controlled thereby such that the gain of the amplifier means is varied as the feedback path in parallel with the fixed gain amplifier is varied by the selectively controlled operation of said switching devices.

9. The signal generator recited in claim 1 wherein said amplifier means includes, a plurality of stages of amplification, interconnection means in each of said stages except the last stage, said interconnection means arranged to maintain the succeeding stages relatively inoperative until the amplification factor thereof is required, said interconnection means being connected to and controlled by the level of said input signals.

10. The signal generator recited in claim 1 wherein said squarer means includes, a pair of field-effect transistors connected in parallel, means for connecting signals thereto from said amplifier means and further output means connected to said field-effect transistors, said field-effect transistors operative to produce a signal at said further output means which is proportional to the square of the signal from said amplifier means.

11. The signal generator recited in claim 1 wherein said averager means includes, filter means, voltage control means connected to said filter means to control the voltage supplied thereto, and switch means for controlling the portion of said filter means to which said voltage is supplied.

12. The signal generator recited in claim 11 including level sensor means for detecting the level of the input signal supplied by said input means, gating means for supplying output signals having one of two levels as a function of the level of said input signals, said gating means connected to said switch means to control the operation thereof as a function of the level of said output signal of said gating means.

13. The signal generator recited in claim 1 wherein said amplifier means exhibits variable gain, means for generating signals as a function of a change in the gain of said amplifier means, and gate means connected to said last named means for producing signals indicative of the number of gain changes which have occurred.